(12) United States Patent
Carmeli

(10) Patent No.: US 6,301,052 B1
(45) Date of Patent: Oct. 9, 2001

(54) OPTICAL SYSTEM FOR DIRECTING AN AUXILIARY IMAGE TOWARDS AN OBSERVER SO AS TO BE SUPERIMPOSED ONTO A MAIN IMAGE

(75) Inventor: Ran Carmeli, Magshimim (IL)

(73) Assignee: Vectop Ltd., Rosh Ha'ayin (IL)

( * ) Notice: Subject to any disclaimer, the term of this patent is extended or adjusted under 35 U.S.C. 154(b) by 0 days.

(21) Appl. No.: 09/719,052

(22) Filed: Dec. 7, 2000

Related U.S. Application Data

(63) Continuation of application No. PCT/IL99/00304, filed on Jun. 8, 1999.

(30) Foreign Application Priority Data

Jun. 8, 1998 (IL) .......................................................... 124816

(51) Int. Cl.$^7$ .............................. G02B 27/14; G02B 5/04
(52) U.S. Cl. .......................... 359/630; 359/631; 359/633; 359/834
(58) Field of Search ...................................... 359/630, 631, 359/633, 634, 833, 834; 345/7, 8

(56) References Cited

U.S. PATENT DOCUMENTS

| 4,697,882 | * | 10/1987 | Sato et al. | .............................. 359/640 |
| 5,052,800 | | 10/1991 | Mimmack et al. | ............. 356/139.03 |
| 5,708,522 | * | 1/1998 | Levy | ..................................... 359/240 |
| 6,094,287 | * | 4/2000 | Li | .......................................... 359/211 |

FOREIGN PATENT DOCUMENTS

| 3809656-A1 | * | 10/1989 | (DE) | .............................. G02B/25/00 |
| 38 09 656 | | 10/1989 | (DE) . | |
| 3917200 | | 11/1990 | (DE) . | |
| 0 303 742 | | 2/1989 | (EP) . | |
| 2 222 892 | | 3/1990 | (GB) . | |
| 2222892-A | * | 3/1990 | (GB) | .............................. G02B/27/10 |
| 3917200-A1 | * | 11/1990 | (GE) | .............................. G02B/23/14 |

* cited by examiner

*Primary Examiner*—Ricky Mack
(74) *Attorney, Agent, or Firm*—Browdy and Neimark

(57) ABSTRACT

Optical system for directing an auxiliary image towards an observer so as to be superimposed on to a main image. The optical system comprises a pentagonal prism having a first surface for intercepting the auxiliary image and directing an auxiliary image beam toward an opposing second surface so as to be internally reflected by the second surface towards a third surface so as to be internally reflected by the third surface and propagated out of the pentagonal prism through a fourth surface opposite the third surface towards the observer. At least one of the surfaces of the pentagonal prism is aspheric and a directing optics constituted by a wedge proximate and external to the third surface directs a main image beam derived from the main image through the third surface into the pentagonal prism and out of the fourth surface thereof towards the observer.

11 Claims, 1 Drawing Sheet

OPTICAL SYSTEM FOR DIRECTING AN AUXILIARY IMAGE TOWARDS AN OBSERVER SO AS TO BE SUPERIMPOSED ONTO A MAIN IMAGE

The present application is the national stage under 35 U.S.C. 371 of PCT/IL99/00304, filed Jun. 8, 1999.

FIELD OF THE INVENTION

This invention relates to optical combiners for superimposing two images.

BACKGROUND OF THE INVENTION

It is a frequent requirement to superimpose one optical image on another. For example, in a pilot head-up display, aircraft instruments may be imaged and projected on to the helmet visor as a virtual image emanating from infinity, so as to be superimposed on the landscape image seen through the visor. As is well known, such a technique obviates the need for the pilot to remove his gaze from the landscape in order to read the instrument panel.

FIG. 1 is an optical ray diagram showing schematically a typical prior art optical combiner depicted generally as 10 for combining an image of an instrument 11 on to an external image seen by an observer 12. The instrument panels is imaged by an imaging objective 13 so as to project an incident beam of light 14 on to a beam splitter 15 having a partially reflective coating. A first portion 16 of the incident beam is reflected by the beam splitter 15 toward a concave reflector 17 which reflects the first portion 16 back through the beam splitter 15 as a second portion 18 towards the observer 12.

It is thus apparent that the beam splitter constitutes a major limitation in the overall efficiency of the optical system 10. This limitation derives from the fact that the beam splitter both reflects and transmits the incident beam and that any improvement to the reflectivity is at the expense of transmissivity and vice versa. For this reason optimal results are achieved when the reflectivity and transmissivity of the beam splitter are equal, Thus, in an optimally configured system the beam splitter 15 may be assumed to reflect and transmit 50% of the light incident thereon. On this basis, the first portion 16 of the beam reflected by the beam splitter 15 has only 50% of the intensity of the original beam emanating from the instrument 11. The second portion 18 of the incident beam which finally reaches the observer 12 after yet again passing through the beam splitter 15 has a net intensity equal to only 25% of the intensity of the original light beam. This figure assumes 100% transmission through the imaging objective 13 and the concave reflector 17, which can never be met in practice. Thus, allowing for only 90% reflection by these two optics, the net intensity of the beam reaching the observer is close to 20% of the original beam. The net intensity can be increased somewhat to between 30 to 50% by employing polarizers or λ/4 plates for the concave reflector 17. However, any improvements to the transmissivity of the imaging objective 13 and to the reflectivity of the concave reflector 17 are marginal compared to the 25% net propagation of the beam through the beam splitter 15.

EP 0 303 742 discloses a head-up display for aircraft cockpits comprising an optical system for directing an image produced by a CRT on to a partly-reflective screen in the pilot's field of view. A prism having at least one curved face that acts as a lens replaces the fold mirror in previous systems allowing the CRT image to be directed towards the observer from a different direction than the external scene. The prism allows the optical system to be kept compact. In such a system, at least one combiner screen, or beam splitter, must still be used to present both images to the observer simultaneously.

SUMMARY OF THE INVENTION

It is thus an object of the invention to provide an improved optical system for combining two images whilst avoiding the need for a beam splitter.

According to the invention there is provided an optical system for directing an auxiliary image towards an observer so as to be superimposed on to a main image, the optical system comprising:

a pentagonal prism having a first surface for intercepting the auxiliary image and directing an auxiliary image beam toward an opposing second surface so as to be internally reflected by the second surface towards a third surface so as to be internally reflected by the third surface and propagated out of the pentagonal prism through a fourth surface opposite the third surface towards the observer, and optical means proximate and external to the third surface for directing a main image beam derived from the main image through the third surface into the pentagonal prism and out of the fourth surface thereof towards the observer.

In essence, the invention substitutes a pentagonal prism for the beam splitter used in conventional optical combiners. Within the pentagonal prism, light is internally reflected by both the second and third surfaces using internal reflection, such that the effective reflectivity of each surface can be close to 90% (subject to other possible limitations). Likewise, the effective transmissivity of the main image through the third and fourth surfaces, can be kept relatively high (especially when using a dichroic reflective coating on the third surface) as can be the transmissivity of the auxiliary image through the first surface. Thus, the auxiliary image can be very efficiently projected (with more than 75% efficiency) while keeping the main image with very high (depends on the dichroic coating on the third surface) transmission coefficient. This represents a significant improvement over hitherto proposed systems based on conventional beam splitters.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
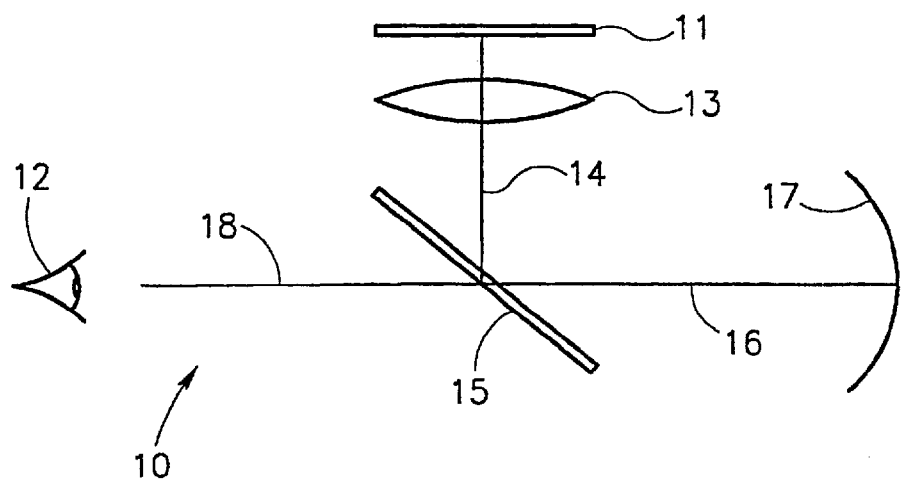
FIG. 1 is an optical ray diagram showing schematically a typical prior art optical combiner.
Figure 2:
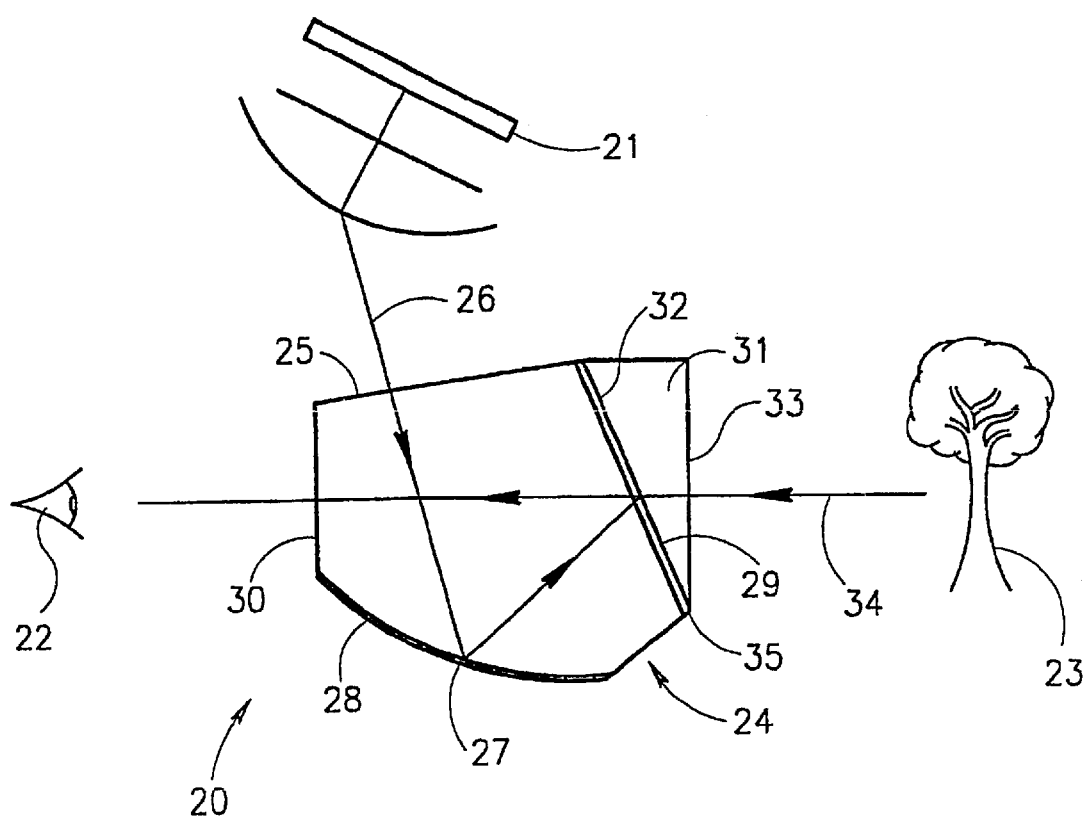
FIG. 2 is an optical ray diagram showing schematically an optical combiner according to the invention.

FIG. 2 shows an optical system 20 for directing an auxiliary image derived from a display device 21 towards an observer 22 so as to be super-imposed on to a main image 23. The optical system comprises a pentagonal prism 24 having a first surface 25 for intercepting the auxiliary image and directing an auxiliary image beam 26 toward an aspherical opposing second surface 27. The second surface 27 is coated with a reflective coating 28 so as to reflect the auxiliary beam towards a third surface 29 thereof. The third surface 29, coated with a dichroic reflective coating, internally reflects the auxiliary beam and allows it to be propagated out of the pentagonal prism 24 through a fourth surface 30 opposite the third surface 28 towards the observer 22.

A wedge 31 (constituting a directing optics) has a first surface 32 juxtaposed and external to the third surface 29 of the pentagonal prism 24. A second surface 33 of the wedge 31 is parallel to the fourth surface 30 of the pentagonal prism 24 for intercepting a main image beam 34 derived from the main image 23. The main image beam 34 thus propagates through the wedge 31 into the pentagonal prism 24 via the third surface 29 from which it emerges through the fourth surface 30 thereof towards the observer 22.

In order to improve optical efficiency, the third surface 29 of the pentagonal prism 24 is coated with a dichroic reflective coating 35 so as to improve the reflectivity thereof with respect to the auxiliary image beam 26 whilst allowing unimpaired transmission therethrough of the main image beam 34.

The second surface 27 of the pentagonal prism 24 is preferably toric in shape so as to ensure that the high quality auxiliary image be maintained while propagating through the optical system, toward the third surface 29 of the pentagonal prism 24. Light from the auxiliary image is directed through a curved imaging objective 26 (constituting either an aspheric or spherical correction optics) which ensures that light emitted from each point of the display device 21 is dispersed so that it is reflected by the second surface 27 and maintaining the image quality. As a result the beam, which emerges from the fourth surface 30 towards the observer 22, appears to emanate from infinity and thus is seen in focus together with the main image 23 of the distant scene.

It will be appreciated that modifications may be made to the specific optical design of the pentagonal prism without departing from the spirit of the invention. Thus, whilst in the preferred embodiment, the second surface 33 of the wedge 31 is parallel with the fourth surface 30 of the pentagonal prism 24, the same effect may be realized if the two surfaces 30 and 33 form a zero-power optical system (constituting an optical sub-system). Indeed, there may be occasions, when the optical sub-system formed by the second surface 33 of the wedge 31 and the fourth surface 30 of the pentagonal prism 24 are non-zero, and this too is contemplated by the invention.

Likewise, whilst in the preferred embodiment, only the second surface 27 of the pentagonal prism 24 is shown as toric, the invention also contemplates any of the surfaces of the pentagonal prism 24 being planar or toric.

What is claimed is:

1. An optical system comprising: a pentagonal prism having a first surface for intercepting the auxiliary image and directing an auxiliary image beam toward an opposing second surface so as to be internally reflected by the second surface towards a third surface so as to be internally reflected by the third surface and propagated out of the pentagonal prism through a fourth surface opposite the third surface towards the observer, and directing optics proximate and external to the third surface for directing a main image beam derived from a main image through the third surface into the pentagonal prism and out of the fourth surface thereof towards the observer; characterized in that: at least one of the surfaces of the pentagonal prism is aspheric.

2. The optical system according to claim 1, wherein at least one of the surfaces of the pentagonal prism is toric.

3. The optical system according to claim 1, wherein at least one of the surfaces of the pentagonal prism is planar.

4. The optical system according to claim 1, wherein the second surface of the pentagonal prism is coated with a reflective coating so as to improve the reflectivity thereof.

5. The optical system according to claim 1, wherein the direction optics is a wedge having a first surface juxtaposed to the third surface of the pentagonal prism and having a second surface parallel to the fourth surface of the pentagonal prism for intercepting the main image beam.

6. The optical system according to claim 1, wherein the direction optics is a wedge having a first surface juxtaposed to the third surface of the pentagonal prism and having a second surface which forms an optical sub-system with the fourth surface of the pentagonal prism for intercepting the main image beam.

7. The optical system according to claim 6, wherein the optical sub-system is of zero order.

8. The optical system according to claim 1, wherein the auxiliary image beam is derived from a display device.

9. The optical system according to claim 8, including either an aspheric or spherical correction optics intermediate the display device and the first surface of the pentagonal prism for correcting for distortions introduced into the auxiliary image beam.

10. The optical system according to claim 1, wherein the third surface of the pentagonal prism is coated with a dichroic reflective coating so as to improve the reflectivity thereof with respect to the auxiliary image beam whilst allowing unimpaired transmission therethrough of the main image beam.

11. The method of using the optical system according to claim 1 directing an auxiliary image towards an observer so as to be superimposed onto the main image.

* * * * *